No. 872,219. PATENTED NOV. 26, 1907.
A. P. BOYER.
VARIABLE SPEED AND REVERSING TRANSMISSION GEAR.
APPLICATION FILED APR. 1, 1907.
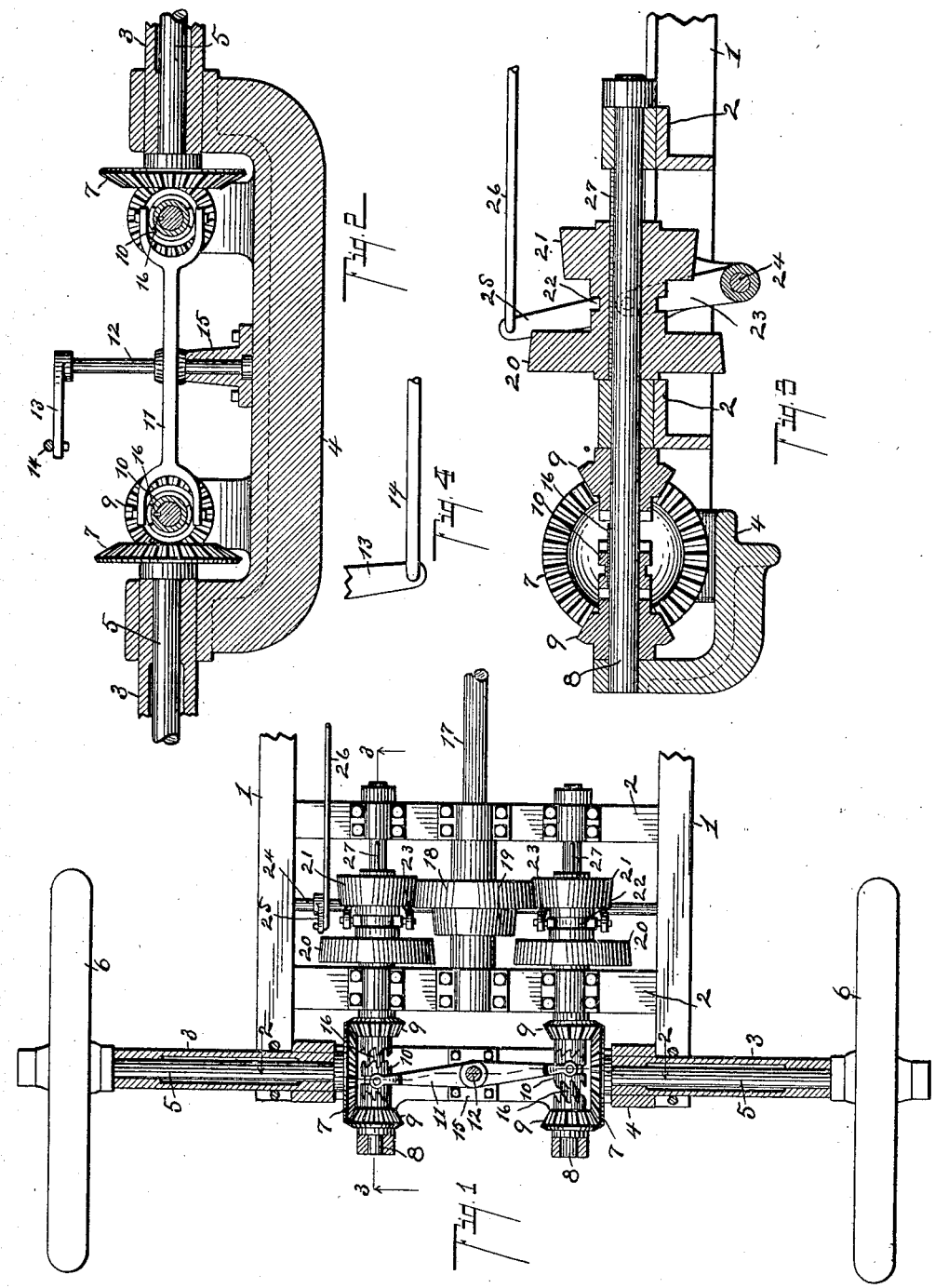
Witnesses:
Inventor,
Allen P. Boyer
By Chappell Earl
Att'ys

UNITED STATES PATENT OFFICE.

ALLEN P. BOYER, OF GOSHEN, INDIANA.

VARIABLE-SPEED AND REVERSING TRANSMISSION-GEAR.

No. 872,219.	Specification of Letters Patent.	Patented Nov. 26, 1907.

Application filed April 1, 1907. Serial No. 365,706.

*To all whom it may concern:*

Be it known that I, ALLEN P. BOYER, a citizen of the United States, residing at the city of Goshen, county of Elkhart, State of Indiana, have invented certain new and useful Improvements in Variable - Speed and Reversing Transmission-Gears, of which the following is a specification.

This invention relates to improvements in variable speed and reversing transmission gears.

The main objects of this invention are, first, to provide an improved variable speed and reversing transmission device having friction gears, in which the strain on the gears and bearings is balanced and reduced to a minimum. Second, to provide an improved variable speed transmission device which may be made comparatively light and at the same time one which is capable of carrying very heavy loads and of withstanding very great strain. Third, to provide an improved variable speed transmission device of the friction gear type, having a minimum amount of friction due to adjustments. Fourth, to provide an improved variable speed and reversing transmission device, which is simple in structure, economical, and easy to operate, and one which is durable and not likely to get out of repair.

Further objects, and objects relating to details of construction, will definitely appear from the detailed description to follow.

I accomplish the objects of my invention by the devices and means described in the following specification.

The invention is clearly defined and pointed out in the claims.

A structure embodying the features of my invention is clearly illustrated in the accompanying drawing, forming a part of this specification, in which, Figure 1 is a detail plan of a structure embodying the features of my invention, the axles 3 being shown in longitudinal section to better show the arrangement of the parts. Fig. 2 is an enlarged detail section taken on a line corresponding to line 2—2 of Fig. 1. Fig. 3 is an enlarged detail section taken on a line corresponding to line 3—3 of Fig. 1. Fig. 4 is a detail of the connections for operating the reverse mechanism.

In the drawing, the sectional views are taken looking in the direction of the little arrows at the ends of the section lines, and similar numerals of reference refer to similar parts throughout the several views.

Referring to the drawing, the frame of my improved transmission device preferably consists of the side rails 1 connected by the cross bars 2, the side rails being connected at their rear ends to the rear axle of the vehicle. The rear axle is preferably made up of the hollow sections 3 connected by the yoke 4, the yoke being centrally arranged, as clearly appears from the drawing. Within the hollow axle sections 3, I arrange axle shafts 5, to which the carrying wheels 6 are secured.

On the inner ends of the axle shafts 5 are bevel gears 7. A pair of driven transmission shafts 8 is arranged transversely of the axle shafts 5, the shafts 8 being arranged parallel. On each shaft 8 is a pair of beveled gears 9, the same being revolubly mounted thereon and arranged to mesh with the gears 8 on the axle shafts.

The gears 9 are connected to the shafts 8 by the double-jawed collar-like clutch members 10, the clutches being slidably secured on the shafts by means of the keys 16. The clutch members 10 are provided with annular grooves with which the forked ends of the lever 11 are arranged to engage. The lever 11 is carried by the vertically-arranged pivot 12 on the upper end of which is an arm 13, which is connected by the rod 14 to a suitable hand lever, not shown, for shifting the clutch members. As the shafts 8 are driven in opposite directions, it is obvious that the front gear 9 on one side and the rear gear 9 on the other side should be connected to drive the vehicle in one direction and vice versa to drive it in the opposite direction. This is effectively and simply accomplished through the mechanism described.

The driving shaft 17, which may be the crank shaft of the engine, or suitably connected thereto, is arranged between the driven shafts 8. On the driving shaft 17 is a pair of friction gears 18 and 19. These gears are conical and of different diameters, and are arranged to face oppositely and preferably outwardly. On the driven shafts 8, I arrange pairs of friction gears 20 and 21. These gears are also conical and are arranged to face each other, the gears 21 being adapted to be brought into engagement with the gear 18 and the gears 20 being adapted to be brought into engagement with the gear 19 on the driving shaft. The gears 20 and 21 are preferably connected by integral hubs having annular grooves 22 therein, which are engaged by the forked arms 23 on the rock shaft 24, arranged transversely below the shafts. By actuating this rock shaft, the gears 20 and 21 may be shifted upon the shafts, to which they are slidably secured by suitable keys 27 to bring either the gears 21 into engagement with the gear 18, or the gears 20 into engagement with the gear 19, as desired, thereby varying the speed at which the shafts are driven, or to entirely disconnect the same. The rock shaft 24 is preferably provided with an upwardly-projecting arm 25 which is connected by the link 26 to a suitable hand lever, not here illustrated. By thus arranging the parts, I secure a variable speed and reverse mechanism having friction drive gears in which the strain upon the shafts is evenly balanced, so that the wear and strain is reduced to a minimum, and a transmission device which is capable of driving the car in either direction with equal facility, which is of very great advantage where the transmission device is applied to railway motor cars and automobiles.

In the structure illustrated, I have shown means for attaining only two speeds. It is evident that this might be increased to any desired number merely by adding further gears, as 18 and 19, to the driving shaft and suitable gears corresponding to the gears 20 and 21 to the driven shafts.

Another feature of advantage of my improved transmission is that the friction occasioned by the adjustment of the mechanism is reduced to a minimum, and there is no unnecessary friction of the gears on each other, that is, no friction other than is necessary to secure the transmission of the power.

My improved transmission device is very simple in construction, and may be made of comparatively light material and at the same time possess sufficient strength to withstand the strain to which it is subjected, and it is very durable in use.

I have illustrated and described the same in detail in the form preferred by me on account of its structural simplicity and economy. I am, however, aware that it is capable of considerable variation in structural details without departing from my invention.

Having thus described my invention, what I claim as new and desire to secure by Letters Patent is:

1. In a structure of the class described, the combination with the axle shafts, of gears thereon; a pair of driven shafts; pairs of gears revolubly-mounted on said driven shafts arranged to mesh with said gears on said axle shafts; clutch members arranged between said gears on said driven shafts and adapted to connect either of the gears to the shafts; a pivoted lever connected to said clutch members for shifting them in opposite directions; connections for shifting said lever; a driving shaft arranged between said driven shafts; a pair of outwardly-facing conical gears of different diameters arranged on said driving shaft; pairs of inwardly-facing conical gears of different diameters splined upon said driven shafts adapted to be alternately brought into engagement with said gears on said driving shaft or to be disconnected therefrom; a rock shaft; arms on said rock shaft connected to said gears on said driven shafts for shifting the same; and connections for operating said rock shaft.

2. In a structure of the class described, the combination with the axle shafts, of gears thereon; a pair of driven shafts; pairs of gears revolubly-mounted on said driven shafts arranged to mesh with said gears on said axle shafts; clutch members arranged between said gears on said driven shafts and adapted to connect either of the gears to the shafts; a driving shaft arranged between said driven shafts; a pair of outwardly-facing conical gears of varying diameters arranged on said driving shaft; pairs of inwardly-facing conical gears of different diameters splined upon said driven shafts adapted to be alternately brought into engagement with said gears on said driving shaft or to be disconnected therefrom; a rock shaft; arms on said rock shaft connected to said gears on said driven shafts for shifting the same; and connections for operating said rock shaft.

3. In a structure of the class described, the combination with the axle shafts, of gears thereon; a pair of driven shafts; pairs of gears revolubly-mounted on said driven shafts; clutch members arranged between said gears on said driven shafts and adapted to connect either of the gears to the shafts; a pivoted lever connected to said clutch members for shifting them in opposite directions; connections for shifting said lever; a driving shaft arranged between said driven shafts; a pair of outwardly-facing conical gears of different diameters splined upon said driven shafts adapted to be alternately brought into engagement with said gears on said driving shaft or to be disconnected therefrom; and means for shifting said gears on said driven shaft.

4. In a structure of the class described, the combination with the axle shafts, of gears thereon; a pair of driven shafts; pairs of gears revolubly-mounted on said driven shafts arranged to mesh with said gears on said axle shafts; clutch members arranged between said gears on said driven shafts and adapted to connect either of the gears to the shafts; a driving shaft arranged between said driven shafts; a pair of outwardly-facing conical gears of different diameters arranged on said driving shaft; pairs of inwardly-facing conical gears of different diameters splined upon said driven shafts adapted to be alternately brought into engagement with said gears on said driving shaft or to be disconnected therefrom; and means for shifting said gears on said driven shafts.

5. In a structure of the class described, the combination with a pair of driven shafts; a driving shaft arranged between said driven shafts; a pair of outwardly-facing conical friction gears of different diameters arranged on said driving shaft; pairs of inwardly-facing conical friction gears of different diameters splined upon said driven shafts adapted to be alternately brought into engagement with said gears on said driving shaft or to be disconnected therefrom; a rock shaft; arms on said rock shaft connected to said gears on said driven shafts for shifting the same; and connections for operating said rock shaft.

6. In a structure of the class described, the combination with a pair of driven shafts; a driving shaft arranged between said driven shafts; a pair of outwardly-facing conical friction gears of different diameters arranged on said driving shaft; pairs of inwardly-facing conical friction gears of different diameters splined upon said driven shafts adapted to be alternately brought into engagement with said gears on said driving shaft or to be disconnected therefrom; and means for shifting said gears on said driven shafts.

7. In a structure of the class described, the combination with the axle shafts, of gears thereon; a pair of driven shafts; pairs of gears revolubly-mounted on said driven shafts arranged to mesh with said gears on said axle shafts; clutch members arranged between said gears on said driven shafts and adapted to connect either of the gears to the shafts; a pivoted lever connected to said clutch members for shifting them in opposite directions; connections for shifting said lever; a driving shaft arranged between said driven shafts; conical gears of different diameters arranged on said driving shaft; and conical gears of different diameters arranged upon said driven shafts adapted to be engaged with said gears on said driving shaft or to be disengaged therefrom.

8. In a structure of the class described, the combination with the axle shafts, of gears thereon; a pair of driven shafts; pairs of gears revolubly-mounted on said driven shafts arranged to mesh with said gears on said axle shafts; clutch members arranged between said gears on said driven shafts and adapted to connect either of the gears to the shafts; a driving shaft arranged between said driven shafts; conical gears of different diameters arranged on said driving shaft; and conical gears of different diameters arranged upon said driven shafts adapted to be engaged with said gears on said driving shaft or to be disengaged therefrom.

9. In a structure of the class described, the combination with a pair of driven shafts; a driving shaft arranged between said driven shafts; conical friction gears of different diameters on said driving shaft; and conical friction gears of different diameters arranged upon said driven shafts adapted to be engaged with said gears on said driving shaft or to be disengaged therefrom.

In witness whereof, I have hereunto set my hand and seal in the presence of two witnesses.

ALLEN P. BOYER. [L. S.]

Witnesses:
   LLOYD L. BURRIS,
   MARTIN V. KEELER.